US005978717A

United States Patent [19]

Ebersöhn et al.

[11] Patent Number: 5,978,717
[45] Date of Patent: Nov. 2, 1999

[54] COMPUTER SYSTEM FOR RAILWAY MAINTENANCE

[75] Inventors: Willem Ebersöhn, Pretoria, South Africa; Ernest Theodore Selig, III, Amherst; Ernest Theodore Selig, IV, Concord, both of Mass.

[73] Assignee: Optram, Inc., Concord, Mass.

[21] Appl. No.: 08/784,044

[22] Filed: Jan. 17, 1997

[51] Int. Cl.⁶ .............................. G06F 7/70; G08G 1/01; G08G 1/052; G01C 3/00
[52] U.S. Cl. ............................. 701/19; 701/28; 701/117; 340/435; 340/937
[58] Field of Search .............................. 701/19, 28, 117; 340/435, 937

[56] References Cited

U.S. PATENT DOCUMENTS

| 5,790,403 | 8/1998 | Nakayama | 701/28 |
| 5,794,172 | 8/1998 | Mathenson et al. | 701/117 |
| 5,815,823 | 9/1998 | Engle | 701/19 |

OTHER PUBLICATIONS

Hide et al., "B1.8 The TM$ Track Management System," track Maintenance Planning on the Burlington Northern Railroad, Track Infrastructure Maintenance Management 1994, University of Pretoria Railway Engineering.

Eberson et al., "Track Infrastructure Maintenance Management Cource Notes, "University of Pretoria Railway Engineering, South Afrida, Appendix B, 1994.

Ecotrack Project by European Rail Research Institute, "Decision Support System for Permanent Way Maintenance and Renewal," brochure, 1996.

Shenton, Dr. Mike, "Review of British Rail Systems," British Rail Infrastructure Maintenance and Renewal Planning System, Track Infrastructure Maintenance Management, 1994, University of Pretoria.

"What's the Purpose of RailDirect?", *http://www.ironwoodtech.com/rdgenerl.htm,*(1996, Mar. 23).

*Primary Examiner*—William A. Cuchlinski, Jr.
*Assistant Examiner*—Olga Hernandez
*Attorney, Agent, or Firm*—Hamilton, Brook, Smith & Reynolds, P.C.

[57] ABSTRACT

Track maintenance management is defined by the present invention as the integration of all the maintenance engineering tasks which ensure that optimum levels of availability and overall performance of the track infrastructure are achieved in order to meet business objectives. The present invention provides the tools for effective track maintenance management and ensures that an economic balance between resource input and condition of the track infrastructure is maintained while still providing a competitive transport service. The present invention incorporates an essential database and a means of keeping it current. The present invention also provides a means for visualizing and interrelating the sets of data to improve maintenance decisions. The present invention also represents track condition by moving calculation which helps identify problems areas.

13 Claims, 6 Drawing Sheets

COMPUTER SYSTEM FOR RAILWAY MAINTENANCE

BACKGROUND OF THE INVENTION

Worldwide, railways provide one of the most common ways of transporting cargo and passengers. As used herein "railways" includes above-ground as well as underground systems of tracks and related facilities. Typically a system of tracks guide and support a train-type vehicle formed of a series of cars. Various track configurations are employed. Examples include:

metal rails on cross ties, metal rails on slabs, and concrete or steel guide ways.

Traditionally track maintenance decisions have been made by railroad personnel using knowledge obtained from visual field inspection of track, track drawings, records of measured geometry defects (i.e., deviation of track for specified configuration), train ride characteristics reported by locomotive drivers, knowledge of recent maintenance history. Much of the relevant information influencing the decision is not in readily acceptable form and is difficult to integrate and visualize by maintenance managers. Thus the process of deciding on the optimum maintenance approach is difficult with the consequence that sub-optimal decisions usually result. Human judgment is essential, but is handicapped by the difficulty in comparing all of the influencing information. Furthermore much of the critical information is known mainly by the maintenance personnel responsible for a particular section of track. This knowledge is not readily transferred when the personnel change. Hence much of the information is lost because of the unavailability of permanent accessible records. It is evident from the above discussion that the optimization of the process of maintenance management would be greatly enhanced by a suitable means to acquire, measure, report, and integrate the relevant information. A number of software tools have been developed for planning maintenance and renewal of railway track. Examples include:

TM$—Burlington Northern Railroad

MARPAS & Mini-MARPAS—British Rail

ECOTRACK—European Rail Research Institute (ERRI)

Applicants of the present invention discovered disadvantages of the prior art approaches as follows:

1. Prior art maintenance programs focus on predicting maintenance needs based on assumed maintenance strategies and economic analysis. Each necessarily uses a database which includes certain selected and sometimes incomplete items such as maintenance history, traffic patterns, and track geometry as a measure of condition. Computer models substitute for maintenance personnel and limit their involvement in determining maintenance needs and performing cost evaluations. As a result:
   a) incomplete and unverified data results in incorrect or inefficient maintenance decisions,
   b) imperfect models caused by the complexity of real-world situations even with complete and correct data also result in unsatisfactory maintenance decisions.
2. Prior art maintenance programs analyze predefined discrete sections of track. The selection of a discrete section is typically based on track features and usage within which performance is assumed to be uniform so that the same maintenance would be applied throughout the section. Each predefined section is treated as being uniform in condition; i.e., an average of the track condition over the length of the section is utilized in the analysis. The sections so defined are not generally uniform as assumed and hence maintenance is often done where it is not needed and not done where is needed, i.e., maintenance is not optimally performed.
3. Track performance is in essence represented by longevity of track geometry and extent of required maintenance to meet traffic demands and safety regulations. Many factors influence track performance such as traffic, track features, terrain, drainage conditions, and weather. For proper track maintenance management these factors need to be correlated and studied by persons responsible for maintenance planning. These factors are often not recorded or difficult to access. Furthermore the large amount, the detailed, and the uncorrelated nature of the information make interpretation difficult even when the information is available. The ability to overcome these limitations would permit the maintenance manager to make more effective maintenance decisions even when constrained by limited available funding, and restricted track availability.

The following publication relates to the subject matter of the present invention and is incorporated by reference.

Ebersohn, W., and Selig, E. T. "Use of Track Geometry Measurements for Maintenance Planning". Transportation Research Record No. 1470, *Railroad Research Issues*, Washington, D.C., pp. 73–83, 1994.

SUMMARY OF INVENTION

The present invention provides an improved method and tools for making better track maintenance management decisions using computer methods and apparatus to overcome the disadvantages of the prior art in the following ways:

1. Providing a means for establishing the required database and keeping it current, and then visually presenting and interrelating important factors needed by the maintenance manager to identify locations and nature of needed maintenance.
2. Track condition is represented by a moving calculation. This treats condition measurements as a continuum and not by predefined discrete sections. This method permits the use of successive measurement runs to define the rate of change in conditions. This approach is used to identify and rank areas for maintenance and renewal independent of track features and usage.
3. Graphically interrelating the influences of track performance. The relation of these influences allows the maintenance manger to correlate the factors needed to accurately assess the cause of the problems and assist in determining the appropriate corrective action. The graphical method enables the interpretation of the large amount of maintenance information and of the detailed and the uncorrelated nature of the maintenance information.

BRIEF DESCRIPTION OF THE DRAWINGS

The foregoing and other objects, features and advantages of the invention will be apparent from the following more particular description of preferred embodiments and the drawings in which like reference character refer to the same parts throughout the different views. The drawings are not necessarily to scale, emphasis instead being placed upon illustrating the principles of the invention.

DETAILED DESCRIPTION OF THE PREFERRED EMBODIMENTS SYSTEM CONCEPT

The Track Maintenance Management (TMM) system of the present invention collects, correlates and displays railroad maintenance data and provides basic analysis tools. The present invention system provides information to, and collects data from all track maintenance personnel through a distributed computer network. A central TMM database integrates railway information encompassing the following areas:

Layout—Configuration of rail line elements along a rail route including aspects such as number of lines, curvature of track, and location of bridges, tunnels, signals, turnouts, drainage, cuts and fills.

Inventory—Track component description such as type of tie, rail, fastener, ballast and installation date; also description of structures such as bridges and culverts.

Condition—Location and date of track condition information such as rail breaks, ultrasonic/x-rays defects, rail wear, rail corrugation, track geometry measurements, ground penetrating radar scans, drainage, ballast, subgrade.

Maintenance Input—Location and date of maintenance action taken, including aspects such as rail break repair, rail grinding, tamping, ballast cleaning, and tie replacement.

Traffic—Accounting of annual tonnage, axle loads, frequency of usage, and types of traffic.

Weather—Seasonal precipitation and temperature ranges.

Cost Information—Cost of items such as train delays, maintenance, and track components.

Analysis—Geometry changes with time, rate of tie replacement.

Figure 1:
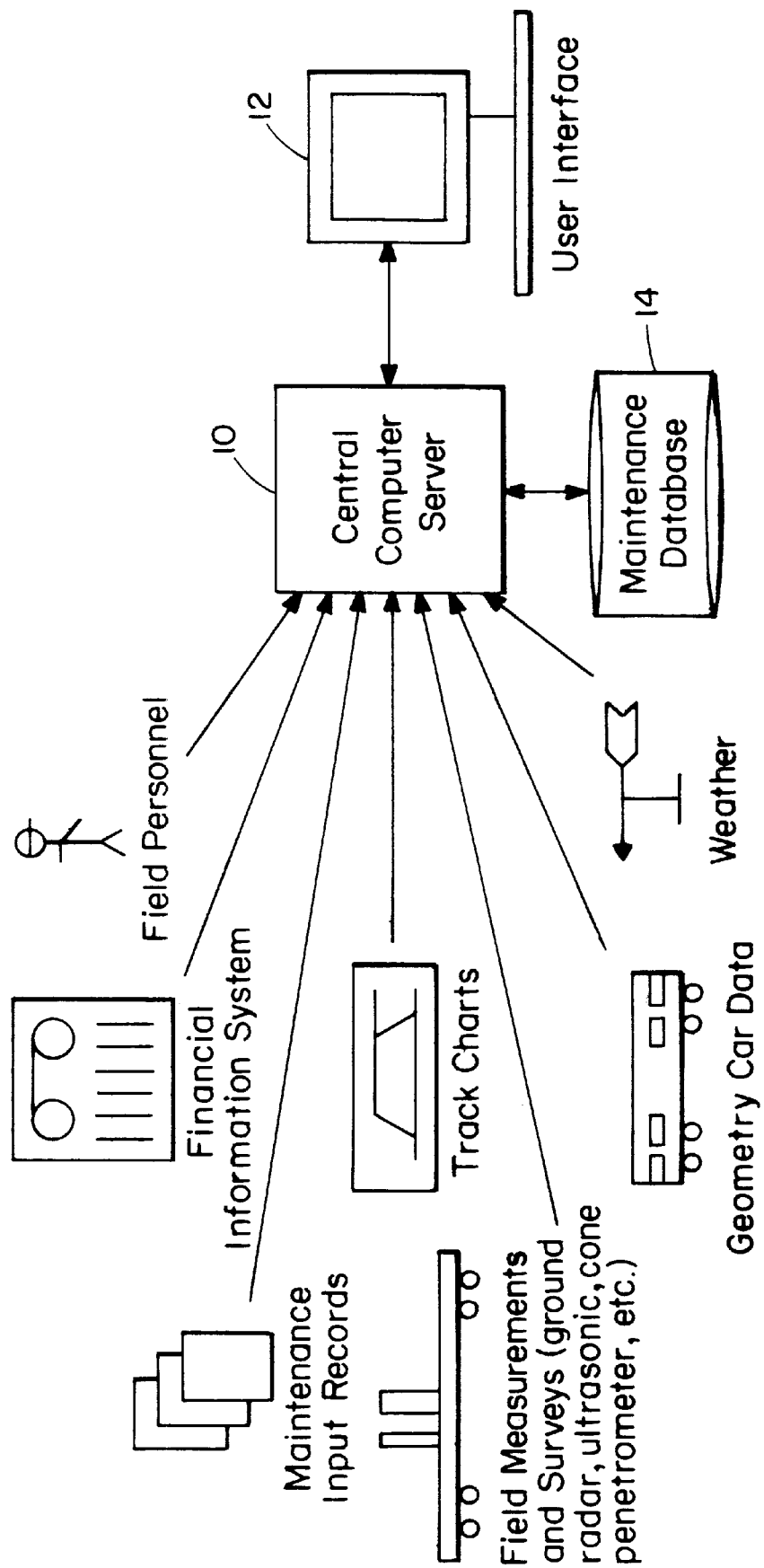
FIG. 1—System Overview, is schematic diagram of a system embodying the present invention.

A TMM central database is derived from a variety of railroad data sources and provides information to multiple system users. The TMM central database forms part of the railroad's information system. The TMM central database may also be enhanced to dynamically interact with other railroad information servers through client-server database standards. FIG. 1—System Overview, illustrates a system overview.

A central office computer server 10 provides a repository for all layout, inventory, condition and maintenance input, traffic, weather, cost information, and analysis data. Data inputs are collected from multiple railroad sources including existing computer systems, paper records (e.g., maps), track experts (e.g., Track Inspectors, Track Supervisors, District Engineer), inspection equipment (e.g., Geometry Car, Sperry Rail Flaw Detector Car, Ground Penetrating Radar, etc.), and sensors (e.g., traffic and weather).

The central server 10 maintains and stores this data in the central working database 14. Central server 10 and working database 14 employ forward and store, search and retrieve and other common protocol common in the art for maintaining and accessing database data. In the preferred embodiment, protocols of a client/server paradigm are utilized.

A wide range of railroad personnel use the present invention system. Track Supervisors, Corporate Directors, Traffic Control, and Engineering personnel are all examples of the present invention system users. Railroad personnel in the field add and modify the present invention data. Railroad office personnel interpret and validate the present invention data. All of the present invention system users use TMM data in a way that optimize the performance of railroad maintenance input.

Figure 2:
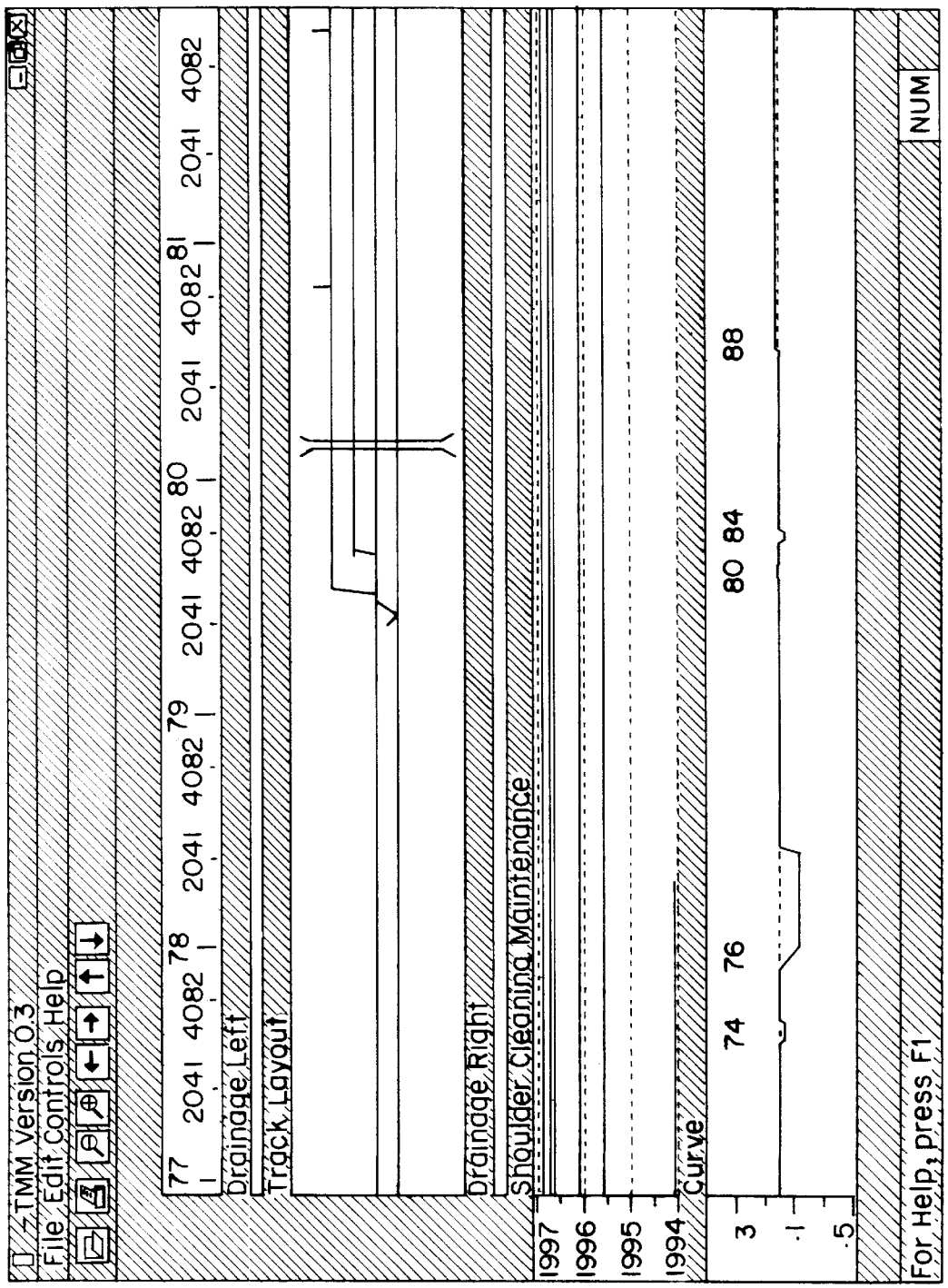
FIG. 2—User Interface, is a sample depiction of a user interface presentation provided by the system in FIG. 1.

A TMM user interface 12 of the present invention provides a powerful analysis tool by its ability to integrate layout, inventory, condition, maintenance input, traffic, weather, and cost influences at any location along a rail line route. The ability to have a combined view of the maintenance management influences provides the tool necessary to correlate symptoms and influences needed to assist in resolving the cause of track deterioration and choose corrective action. An example is shown in FIG. 2.

The present invention TMM computer display screen is subdivided into multiple windows (shown simultaneously) with common X-axis, which defines the location along the rail line. A menu selects components of maintenance management information to be combined in the present invention TMM user interface. Each window has an independent vertical Y-axis and a common horizontal X-axis. The X-axis is displayed with the rail line's mile-markers. A user thus scrolls left and right to view data along the line for each selected track. The X-axis scale is in miles and may also be zoomed in and out to view information over a shorter or longer length of track.

The layout window graphically displays a plan view of all the tracks on a line. The track under observation is highlighted in the layout window. Other windows of the present invention show inventory, condition, maintenance input, traffic, weather, cost, and analysis information related to the track under observation. In response to user command, different combinations of windows are shown simultaneously to provide a view of different combinations of the present forgone information along the same distance of track as described by the user. Each such window is further described below in conjunction with FIG. 2 through FIG. 10.

System Description

As briefed above the present invention TMM system includes a user interface 12 and a central database 14 (FIG. 1). The user interface 12 provides access to the database 14 for adding, maintaining, and analyzing the railway maintenance management data. The database 14 provides a system repository for maintenance management data and access to information used for system wide planning.

User Interface

The user interface 12 provides multiple views of the railway maintenance management data. Each type of maintenance management data is displayed in relation to its location along the rail line. The user interface 12 allows the user to interrelate the maintenance management windows against a common X-axis. An example of the user interface 12 display is found in FIG. 2.

There are two types of maintenance management data windows:

1) line-based: displays information between two locations along a rail line, and
2) track-based: displays information between two locations on a single track.

The layout maintenance management window provides a method for selecting a single track from several parallel tracks on a rail line. All other windows display information about the single selected track. In certain views the present invention system displays information graphically. The graphical representations are made up of symbolic icon elements. Each icon represents detailed information about track maintenance information.

The TMM user interface 12 allows the operator to select a region along the rail line by specifying starting and ending location.

A common track mileage ruler is displayed within the user interface window. The track mile markers ruler provides a common indicator of items throughout the different maintenance management windows being displayed at a given time (i.e. simultaneously displayed windows).

The user is able to scroll the symbolic windows using a horizontal scroll bar or some other mechanism. The scroll feature allows the user to view an entire section of track.

The user is able to increase and decrease the length of maintenance management data using a zoom in and out capability. When a symbolic view is zoomed, its X axis direction receives new mile maker limits. The Y axis direction remains unchanged.

Railway Layout Window

Figure 3:
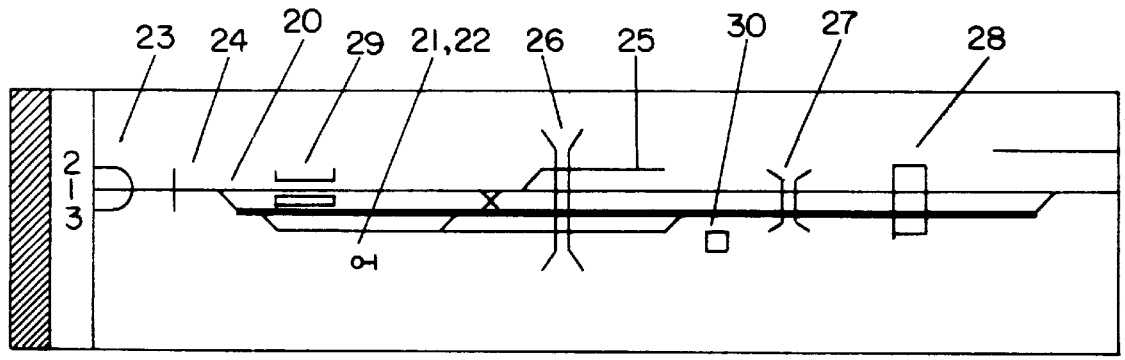
FIG. 3—Railway Layout Example, is an illustration of a graphical representation of railway layout.

The Layout window illustrates the railroad elements along a rail line and the relation between tracks in a rail line. An example is shown in FIG. 3. The Layout window shows a birds-eye-view of the number of tracks in a line and features associated with a point along a rail line.

Each pair of railroad tracks is displayed as a single line along the X-axis. The X-axis is displayed in distance units (i.e., miles) while the Y-axis is displayed in "track number" units. In this window the X-axis represents distance along the track and the Y-axis represents distance from rail line center. For example, see track numbers "2", "1", and "3" along the left column of FIG. 3. The Layout window supports the capability to display multiple sets of parallel tracks located along the same line.

The Layout window provides a mechanism for selecting a track to be displayed in any of the active track-based windows. Track data to be displayed in all other track-based windows is, for instance, selectable by a user placing the mouse pointer over the track and pressing the mouse button. The track chosen by the user is called the "selected track".

Icons displayed on the Layout window depict railroad elements physically located along the rail line. Icons follow a true scale along in the X-axis direction. Icons are displayed with a start location and end location along a rail route.

Rail line elements that influence maintenance management are displayed as graphical icons on the Layout window.

There are two types of Layout icons. Rail line elements that have a discrete position along the rail line are displayed as point icons. Rail line elements that extend over a section of track are displayed as scaled icons that have a start and end position in the Layout window. Some examples of railroad elements displayed as icons on the layout window include:

turnouts (20)
signal bridges (21)
signal masts (22)
catenary poles (electrification mast) (30)
rail joints
crossing diamonds (24)
culverts
pipes
hazard detectors
rail lubricators
tracks (25)
overhead bridges (26)
under-grade bridges (27)
at-grade road crossings (28)
tunnels (23)
platforms (railroad stations) (29)

Earthworks Layout Window

The Earthworks Layout window is another example of a layout window. The Earthworks window displays the geographic elements that surround a track. A rail line grade, and cut/fill (i.e., the banks on either side of the track) characteristics are examples items displayed by this window. Earthworks Layout window the X-axis represents distance along the track. An example of the Earthworks Window is shown in FIG. 4.

The Earthworks Window displays earthwork data for the selected track. In this example the user is shown earthwork data for the left and right sides of the selected track.

Figure 4:
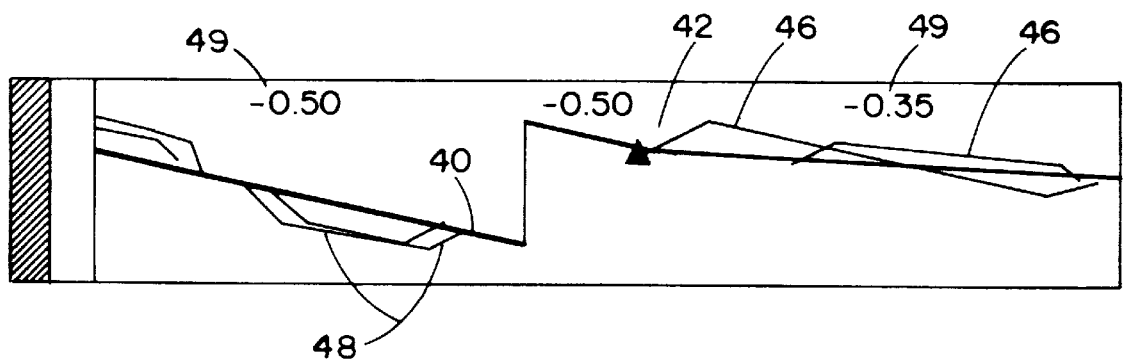
FIG. 4—Earthworks Layout Example, is an illustration of a graphical representation of earthworks related to the railway layout.

Track grade, in FIG. 4, is conveyed graphically and numerically. In this example of a layout window the selected track's grade, 40, is displayed using a line with slope proportional to the grade. In 49 this example shows the capability of displaying the grade numerically above the grade line.

Left and Right Cuts 46 and Fills 48 are illustrated by lines traveling above and below the grade line. A Cut 46 is created along a track when the natural earth is removed to maintain a more even track grade. A Cut 46, in this example, is displayed by drawing a line parallel and above the grade line. A Fill 48 is created along a track when a valley is leveled to maintain a more even track grade. A Fill 48, in this example, is displayed by drawing a line parallel and below the grade line.

Drainage Layout Window

Figure 5:
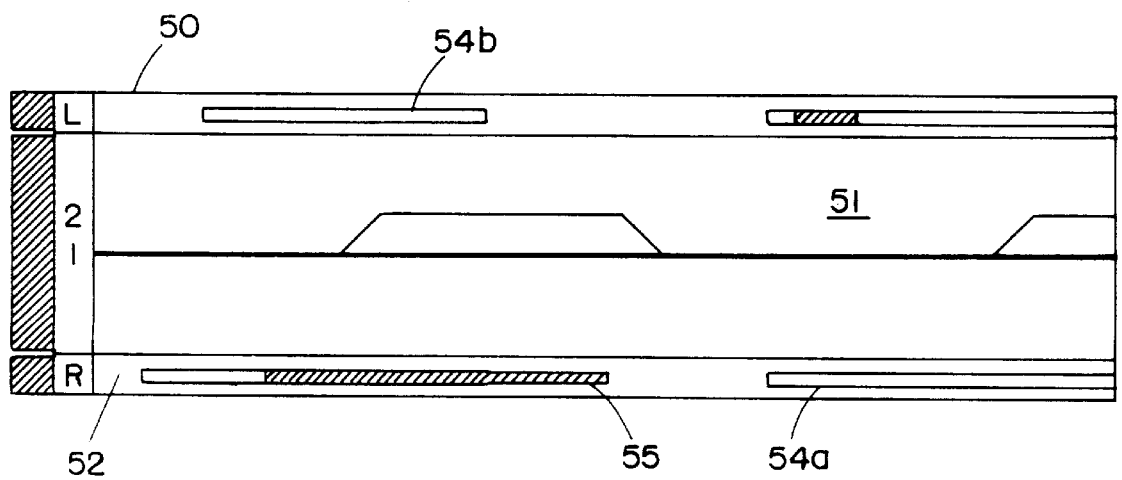
FIG. 5—Drainage Layout Example, is an illustration of a graphical representation of drainage related to the railway layout.

The Drainage version of a layout window displays the selected track's drainage and the presence of standing water. Item 50 and 52 are Left and Right Drainage windows. This example shows the drainage windows placed above and below the Railway Layout window 51. In the Railway Drainage Layout window the X-axis represents distance along the rail line. An example of the Drainage Windows is shown in FIG. 5.

Track drainage systems on the left and right sides of the track are illustrated by rectangles 50 and 52 at the bottom and top of the Railway Layout Window. This portion of the window is called the drainage area. A drainage pipe or drainage ditch is displayed by a horizontal rectangle 54b and 54a drawn from the drains start position to its end position.

Areas of water 55 are shown by a darkened rectangle located on or near the drainage pipe or ditch 54a,b.

Inventory Window

Figure 6:
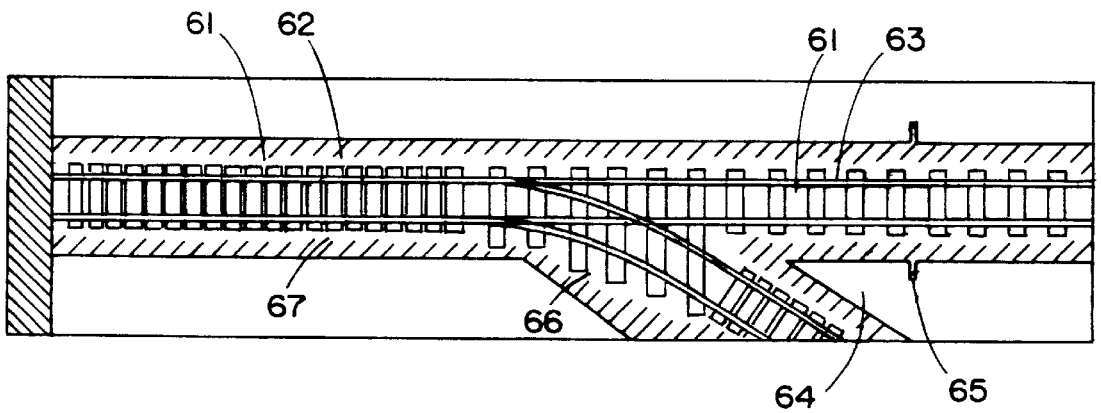
FIG. 6—Inventory Example, is an illustration of a graphical representation of track inventory.

The Inventory window displays a pictorial representation of the elements that make up the selected track. The Inventory window includes such items as rail type 63, tie type, ballast type 67, joints 62, at-grade rail crossings, and turnouts 66. Essentially anything attached to the rail is included in the Inventory window. In the Inventory window the X-axis represents distance along the track and the Y-axis represents distance from track center. An example of the Inventory window is shown in FIG. 6. That example includes an illustration of tie spacing 51, an indication of turnout angle 64 and a ballast type boundary 65.

Curve Layout Window

Figure 7:
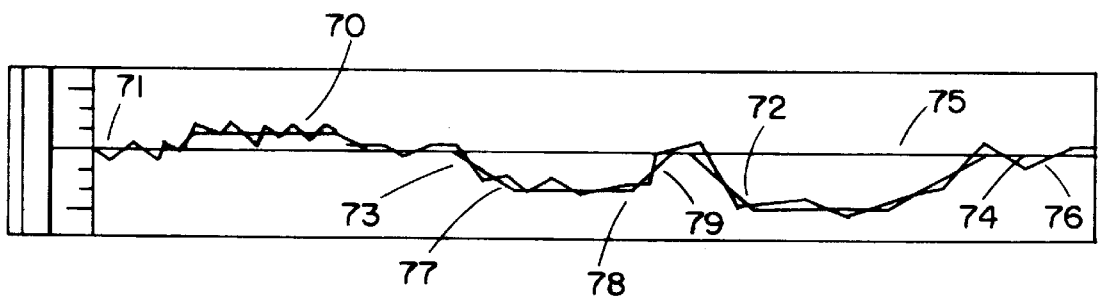
FIG. 7—Curve Layout Example, is an illustration of a graphical representation of a track curve.

A Curve Layout Window plots the designed and measured turn radius and superelevation of the selected track. The window shows curvature related information like ether left or right turns 70 and 72, the designed radius of the curve 74, the measured radius of the curve 76, the designed superelevation (i.e., the amount of bank in the curve) of the curve 74, and the measured superelevation of a curve 76. In the Curve Layout Window the X-axis represents distance along the track and the Y-axis represents curve radius or amount of superelevation. An example of the Curve window is shown in FIG. 7. The curve window is illustrated with a centerline 75 which serves as the reference line for displayed curves and supereleviation. Also displayed are tangents 71, tangent to spiral 73, spiral to curve 77, curve to spiral 78 and spiral to tangent 79.

Data used for the curve window is extracted from two locations. Designed curve data is extracted from a curve database. The measured curve data is derived from geometry car readings.

Other versions of the present invention system support an enhanced model of curve parameters. The present invention TMM database may take these elements into consideration:

Simple Curve

Simple Spiraled Curve

Compound Spiral Curve

Compound Curve

Roughness Condition Window

Figure 8:
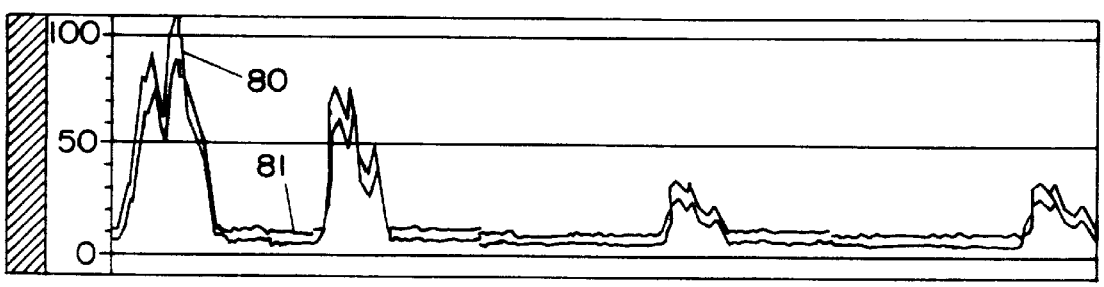
FIG. 8—Roughness Condition Example, is an illustration of a graphical representation of track geometry roughness condition.

The geometry car is used by all major railroads on a regular basis to monitor the track functional condition. Techniques have been developed to identify the location of problems areas and rate of change (Ebersohn, W., and Selig, E. T. "Use of Track Geometry Measurements for Maintenance Planning". Transportation Research Record No. 1470, *Railroad Research Issues*, Washington, D.C., pp. 73–83, 1994). These data also have potential for helping to diagnose the cause of the problems. FIG. 8, shows an example of mid chord offset data for rail profile converted to track roughness to distinguish the rough and smooth sites. Roughness, $R^2$, is defined as the summation of the mid chord offset squared divided by the number of measurement in length of track under consideration.

A Roughness window plots multiple passes of filtered track geometry deviations 80 and 81. Each Roughness window displays one of several types of geometry deviations. In the roughness window the X-axis represents distance along the track and the Y-axis represents amount of deviation from normal. An example of a Roughness window is shown in the FIG. 8.

The Roughness Condition window displays the following types of roughness:

Left and Right Profile,

Left and Right Alignment,

Cross Level,

Curvature, and Gage.

Further, the roughness plot displays multiple passes of geometry data. Each pass 80 and 81 has a date in which the data was collected by the geometry car. In the preferred embodiment the Roughness window each roughness run is plotted in different color.

Condition Window

Figure 9:
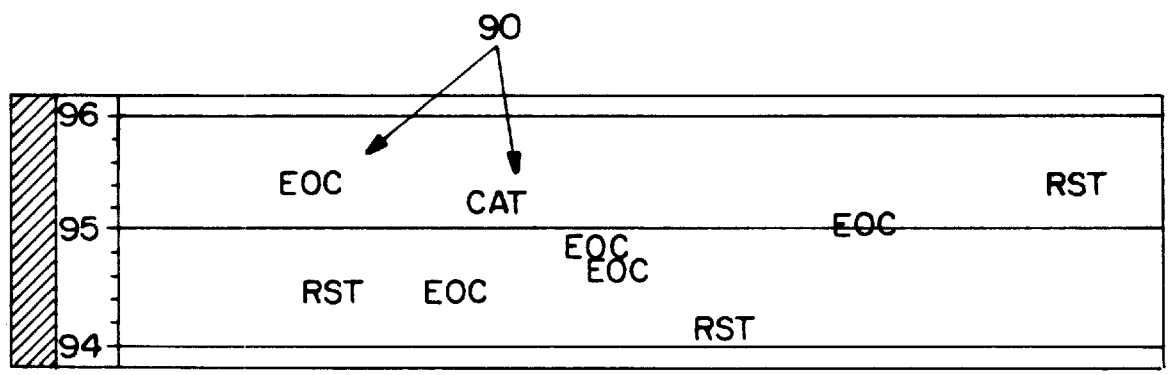
FIG. 9—Condition Example, is an illustration of a graphical representation of rail condition.

A Condition window plots the location and date of rail defects along a track. Examples of rail defects include rail breaks, ultrasonic defects, and spot weld. In the Condition window the X-axis represents distance along the track and the Y-axis represents the date the defect was detected. A letter code 90 is used to specify defect type. An example of the Condition window is shown in FIG. 9.

Maintenance Window

Figure 10:
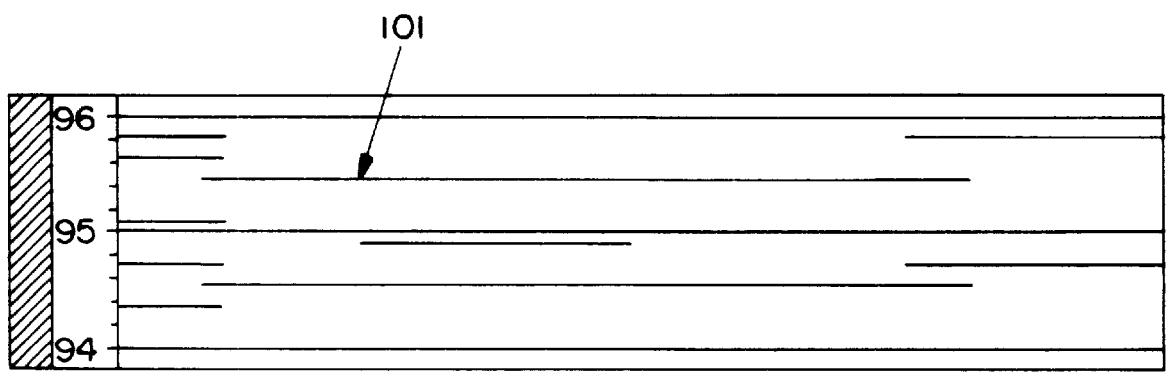
FIG. 10—Maintenance Input Example, is an illustration of a graphical representation of railway maintenance input.
Figure 11:
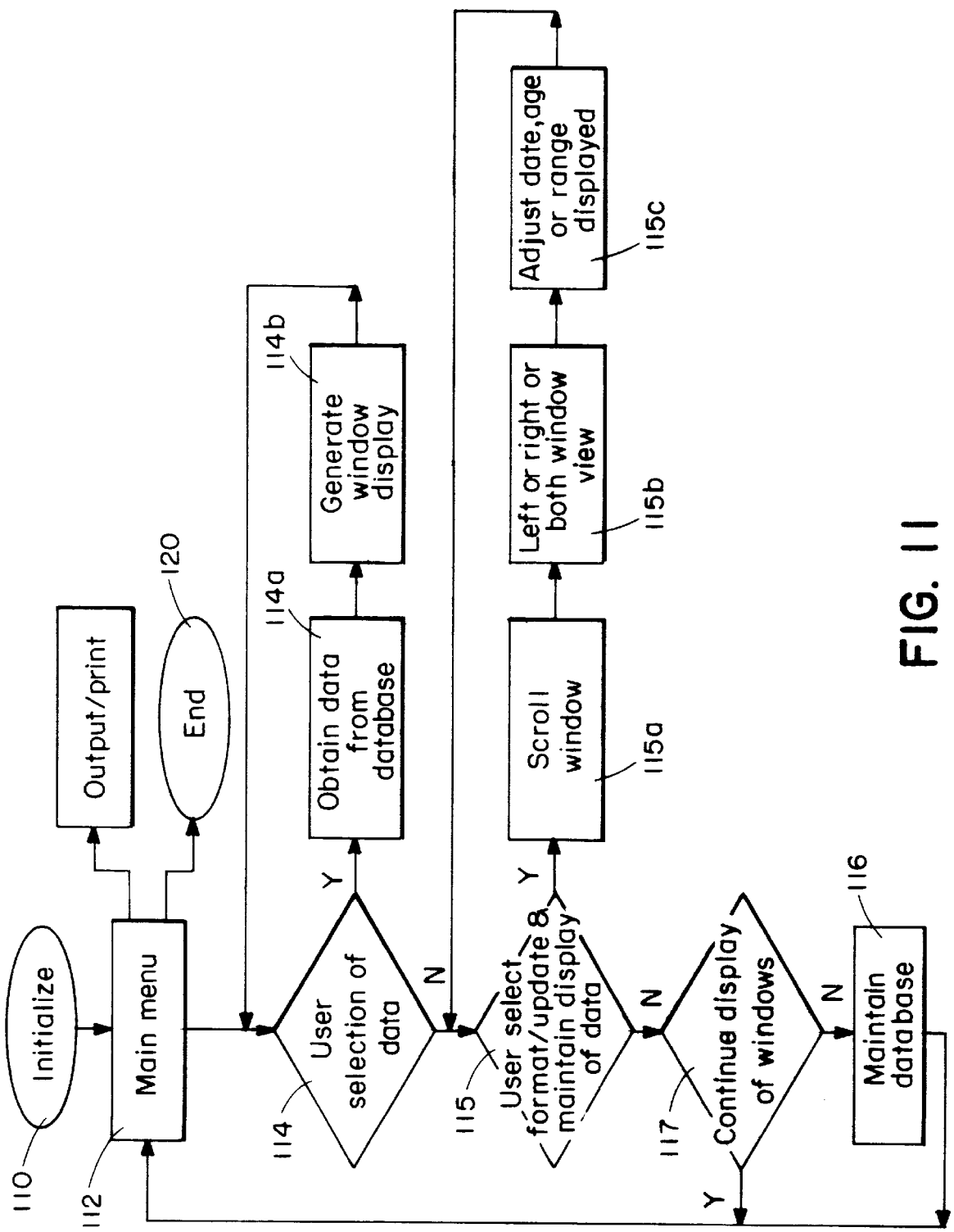
FIG. 11—Present Invention Flow Diagram, is a flow diagram of the software program implementing the present invention in the system of FIG. 1—System Overview.

A Maintenance window plots the location and time of track maintenance activities. There is a Maintenance window for each type of maintenance activity. In the Maintenance window the X-axis represents distance along the track and the Y-axis represents date the maintenance activity was performed. Line 101 illustrates the start and end locations of maintenance activities and the date they were performed. An example of the Maintenance window is shown in FIG. 10. The Maintenance window displays activities such as:

tamping/surfacing (hand, spot mechanical, production)

undercutting/cleaning shoulder cleaning ballast distribution drainage (ditching, drain installation)

rail grinding tie replacement (spot, production)

ballast redistribution and distribution rail replacement joint elimination rail welding gagging pad replacement Program Flow FIG. 11—Present Invention Flow Diagram, outlines the flow of control of one embodiment of present invention system. The system program begins with an initialization step 110. During that step access to the database 14 is opened and the user interface 12 is posted through server 10. As a first part of the user interface 12, server 10 displays a main menu 112 to prompt the user to begin interactive use of the system program. From the main menu 112 the user is able to request display of desired the present invention TMM windows, update the database 14 and the like. In the case where the user selects from main menu 112 certain data windows to be displayed, the program follows display loops 114 and 115.

Loop 114 concerns user selection of data for desired window views. In particular, here the user selects a desired length and location of track, the type of information (e.g., drainage earthworks, rail layout, etc.) for the selected track length and so forth as illustrated in FIGS. 2–10. In response, the system program obtains the appropriate corresponding data at 114a from the central database 14, and generates the windows displays 114b. The combinations of various windows as requested by the user for the subject track length are displayed.

Loop 115 maintains and updates the generated displayed combination of windows. In response to user scrolling 115a, zooming or the like, or user selection of left/right sides 115b, or user specification of a date/age range, the program loop 115 adjusts the displayed windows accordingly 115c.

The user may continue to request display of various data at 117 for the subject track lengths. System program supports these requests through loops 114 and 115 as described above.

The user may terminate the system program at 120 via the main menu 112.

The user and/or various other users may also update the database 14 through the program of FIG. 11. In that case, through a selection in the main menu 112 by the user, the program proceeds to step 116. Subroutine 116 enables user input and modification of data entries in database 14. The system program (and generally subroutine 116) also allows automated update of database 14 from sensors, digital/computer systems, and/or other data gathering and measuring equipment coupled to server 10.

Other selections in main menu 112 are suitable and in the purview of one skilled in the art. Examples include exporting database 14 data for use in other analysis and providing printed hard copy of the present patent system displays. Another selection in main menu 112 ends the system program in a manner consistent with the operation system of server 10.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, the figures are for purposes of illustration and not limitation of the windows displayed by the present invention system. It is understood that other formats, icons, codes and the like for window displays are suitable and are within the purview of one skilled in the art.

We claim:

1. A method for managing railway track maintenance using computer apparatus, the method comprising the steps of:

providing a data storage member coupled to a digital processor, the data storage member for holding track information;

using the digital processor, executing a working routine for (i) enabling input and update of track information held in the data storage member, and for (ii) forming plural working windows, each of different track information for a common length of track, each working window being over a continuum and at a common scale along a length axis, such that the different track information across the different windows is aligned along a common orthogonal axis through each working window, the length of track being selected by a user, the plural working windows enabling the different track information for the common length of track to be simultaneously viewed in alignment, by the user and hence analyzed together; and simultaneously displaying the plural working windows of track information to the user for analysis of different track information together and in alignment along the orthogonal axis, and thus enabling the user to interrelate the different track information.

2. A method as claimed in claim 1 wherein the step of providing a data storage member includes storing in the data storage member track information including rail line layout, inventory, condition, maintenance input, traffic, weather, cost information, analysis.

3. A method as claimed in claim 1 wherein the step of executing a working routine includes forming plural working windows selected from the group of a track layout window, inventory window, condition window, maintenance input window, traffic window, weather window, cost information window, analysis window.

4. A method as claimed in claim 1 further comprising the step of enabling user scrolling of a desired displayed working window.

5. A method as claimed in claim 1 further comprising the steps of:

enabling user selection of left, right or both sides of a track; and adjusting display of the working windows to display track information regarding left, right or both sides of the track as selected by the user.

6. A method as claimed in claim 1 further comprising the step of using displayed track information including track condition measurements to identify and rank problem areas and areas needing track maintenance or track improvements.

7. A method as claimed in claim 6 wherein the step of using displayed track information includes providing a moving roughness calculation from geometry car units.

8. Computer apparatus for managing railway track maintenance comprising:

a digital processor;

a data storage member coupled to the digital processor, the data storage member for holding track information;

a working routine executable by the digital processor for (i) enabling multiple user input and update of track information held in the data storage member, (ii) forming plural working windows, each of different track information for a common length of track, each working window being over a continuum and at a common scale along a length axis, such that the different track information across the different windows is aligned along a common orthogonal axis through each working window, the length of track being selected by a user, the plural working windows enabling the different track information for the common length of track to be simultaneously viewed in alignment by the user and hence analyzed together and (iii) enabling inputting, editing, viewing and exporting data in the form of graphs and/or text for use in track maintenance management; and a display assembly coupled to the digital processor and responsive to the working routine for simultaneously displaying the plural working windows of track information to the user, for analysis of the different track information together and in alignment along the orthogonal axis, the display assembly thus enabling user correlation of the different track information by common length at a point along the track.

9. Computer apparatus for managing railway track maintenance comprising:

a digital processor;

a data storage member coupled to the digital processor, the data storage member for holding track information;

a working routine executable by the digital processor for (i) enabling multiple user input and update of track information held in the data storage member, and for (ii) forming plural working windows, each of different track information for a common length of track, each working window being over a continuum and at a common scale along a length axis, such that the different track information across the different windows is aligned along a common orthogonal axis through each working window, the length of track being selected by a user, the plural working windows enabling the different track information for the common length of track to be simultaneously viewed in alignment by the user and hence analyzed together; and a display assembly coupled to the digital processor and responsive to the working routine for simultaneously displaying the plural working windows of track information to the user, for analysis of the different track information together and in alignment along the orthogonal axis, the display assembly thus enabling user correlation of the different track information by common length at a point along the track;

wherein the data storage member and working routine provide a database for track maintenance management and means for keeping it current.

10. Computer apparatus for managing railway track maintenance comprising:

a digital processor;

a data storage member coupled to the digital processor, the data storage member for holding track information;

automated input means including sensors coupled to the digital processor for providing input and update of track information in the data storage member;

a working routine executable by the digital processor for (i) enabling multiple user input and update of track information held in the data storage member, and for (ii) forming plural working windows, each of different track information for a common length of track, each working window being over a continuum and at a common scale along a length axis, such that the different track information across the different windows is aligned along a common orthogonal axis through each working window, the length of track being selected by a user, the plural working windows enabling the different track information for the common length of track to be simultaneously viewed in alignment by the user and hence analyzed together; and a display assembly coupled to the digital processor and responsive to the working routine for simultaneously displaying the plural working windows of track information to the user, for analysis of the different track information together and in alignment along the orthogonal axis, the display assembly thus enabling user correlation of the different track information by common length at a point along the track.

11. Computer apparatus for managing railway track maintenance comprising:

a digital processor;

a data storage member coupled to the digital processor, the data storage member for holding track information;

a working routine executable by the digital processor for (i) enabling multiple user input and update of track information held in the data storage member, and for (ii) forming plural working windows, each of different track information for a common length of track, each working window being over a continuum and at a common scale along a length axis, such that the different track information across the different windows is aligned along a common orthogonal axis through each working window, the length of track being selected by a user, the plural working windows enabling the different track information for the common length of track to be simultaneously viewed in alignment by the user and hence analyzed together; and a display assembly coupled to the digital processor and responsive to the working routine for simultaneously displaying the plural working windows of track information to the user, for analysis of the different track information together and in alignment along the orthogonal axis, the display assembly thus enabling user correlation of the different track information by common length at a point along the track;

wherein the data storage member and display assembly provide a means to manage large quantities and many varieties of track information affecting track performance.

12. Computer apparatus for managing railway track maintenance comprising:

a digital processor;

a data storage member coupled to the digital processor, the data storage member for holding track information;

a working routine executable by the digital processor for (i) enabling multiple user input and update of track information held in the data storage member, and for (ii) forming plural working windows, each of different track information for a common length of track, each working window being over a continuum and at a common scale along a length axis, such that the different track information across the different windows is aligned along a common orthogonal axis through each working window, the length of track being selected by a user, the plural working windows enabling the different track information for the common length of track to be simultaneously viewed in alignment by the user and hence analyzed together;

a display assembly coupled to the digital processor and responsive to the working routine for simultaneously displaying the plural working windows of track information to the user, for analysis of the different track information together and in alignment along the orthogonal axis, the display assembly thus enabling user correlation of the different track information by common length at a point along the track;

wherein the working routine forms plural working windows, each window selected from the group of a track layout window, inventory window, condition window, maintenance input window, traffic window, weather window, cost information window and analysis window, such that the display assembly displays plural working windows for visually presenting and interrelating two or more factors including rail line layout, inventory, condition, maintenance, traffic, weather, cost information, analysis; and wherein the displayed working windows provide a means to correlate factors, along a common orthogonal axis, needed to accurately assess cause of track condition deterioration.

13. A method for managing maintenance of pathways traveled on by vehicles comprising the steps of:

providing a data storage member coupled to a digital processor, the data storage member for holding pathway information;

using the digital processor, executing a working routine for (i) enabling input and update of pathway information held in the data storage member, and for (ii)

forming plural working windows, each of different pathway information for a common length of pathway, each working window being over a continuum and at a common scale along a length axis, such that the different pathway information across the different windows is aligned along a common orthogonal axis through each working window, the length of pathway being selected by a user, the plural working windows enabling the different pathway information for the common length of pathway to be simultaneously viewed in alignment by the user and hence analyzed together; and simultaneously displaying the plural working windows of pathway information to the user for analysis of different pathway information together and in alignment along the orthogonal axis, and thus enabling the user to interrelate the different pathway information.

* * * * *